US012358356B2

(12) United States Patent
Takahashi et al.

(10) Patent No.: US 12,358,356 B2
(45) Date of Patent: Jul. 15, 2025

(54) LEFT-RIGHT WHEEL DRIVE DEVICE

(71) Applicants: MITSUBISHI JIDOSHA KOGYO KABUSHIKI KAISHA, Tokyo (JP); AISIN CORPORATION, Kariya (JP)

(72) Inventors: Naoki Takahashi, Tokyo (JP); Kiminobu Terao, Tokyo (JP); Yuki Yanagihara, Kariya (JP)

(73) Assignees: MITSUBISHI JIDOSHA KOGYO KABUSHIKI KAISHA, Tokyo (JP); AISIN CORPORATION, Kariya (JP)

( * ) Notice: Subject to any disclaimer, the term of this patent is extended or adjusted under 35 U.S.C. 154(b) by 0 days.

(21) Appl. No.: 18/727,469

(22) PCT Filed: Dec. 7, 2022

(86) PCT No.: PCT/JP2022/045142
§ 371 (c)(1),
(2) Date: Jul. 9, 2024

(87) PCT Pub. No.: WO2023/145268
PCT Pub. Date: Aug. 3, 2023

(65) Prior Publication Data
US 2025/0091421 A1    Mar. 20, 2025

(30) Foreign Application Priority Data
Jan. 28, 2022   (JP) .................. 2022-011500

(51) Int. Cl.
*B60K 7/00*    (2006.01)
*B60K 1/02*    (2006.01)
*F16H 57/04*   (2010.01)

(52) U.S. Cl.
CPC ........... *B60K 1/02* (2013.01); *F16H 57/0471* (2013.01); *F16H 57/0479* (2013.01);
(Continued)

(58) Field of Classification Search
CPC .............. B60K 1/02; B60K 2007/0061; F16H 57/0471; F16H 57/0479; F16H 57/0483;
(Continued)

(56) References Cited

U.S. PATENT DOCUMENTS

2019/0186621 A1*  6/2019  Hagino .................. F16H 57/02
2022/0290749 A1   9/2022  Mizutani et al.
2024/0391314 A1* 11/2024  Okuda ................ F16H 57/0006

FOREIGN PATENT DOCUMENTS

JP    2021063536 A  *  4/2021
WO   WO-2010021413 A2 *  2/2010  .............. B60K 1/02
(Continued)

OTHER PUBLICATIONS

English translation of International Preliminary Report on Patentability and Written Opinion of the International Searching Authority for International Application No. PCT/JP2022/045142, dated Feb. 7, 2023.
(Continued)

*Primary Examiner* — Justin Holmes
(74) *Attorney, Agent, or Firm* — BIRCH, STEWART, KOLASCH & BIRCH, LLP

(57) ABSTRACT

The disclosed left-right wheel drive device (30) includes first tubular surface portions (21), second tubular surface portions (22), and third tubular surface portions (23). The first tubular surface portion (21) is formed into a tubular surface shape along an outer circumference of a driven gear (8). The second tubular surface portion (22) is formed into a tubular surface shape along an outer circumference of a first counter gear (4). The third tubular surface portion (23) is formed into a tubular surface shape along an outer circumference of the first counter gear (4). The upper surface portion (24) is formed into a surface shape connected to an upper end of the third tubular surface portion (23), is
(Continued)

arranged over the first bearing (23), and includes a first oil hole (25) that supplies lubricant to the first bearing (27).

5 Claims, 3 Drawing Sheets

(52) U.S. Cl.
CPC .. *F16H 57/0483* (2013.01); *B60K 2007/0061* (2013.01); *F16H 57/0421* (2013.01); *F16H 57/0423* (2013.01); *F16H 57/0426* (2013.01)

(58) Field of Classification Search
CPC ............. F16H 57/0421; F16H 57/0423; F16H 57/0426
See application file for complete search history.

(56) References Cited

FOREIGN PATENT DOCUMENTS

WO     WO-2020179203 A1 *   9/2020
WO     WO 2021/039966 A1     3/2021

OTHER PUBLICATIONS

International Search Report for PCT/JP2022/045142 mailed on Feb. 7, 2023.
Written Opinion of the International Searching Authority for PCT/JP2022/045142 mailed on Feb. 7, 2023.

* cited by examiner

LEFT-RIGHT WHEEL DRIVE DEVICE

TECHNICAL FIELD

The present invention relates to a left-right wheel drive device that accommodates, in a casing, two electric motors that drive a vehicle and a planetary gear mechanism that amplifies a torque difference between the two electric motors and transmits torques to left and right wheels.

BACKGROUND TECHNIQUE

Conventionally, as a left-right wheel drive device that transmits driving torque generated by two electric motors (motors) independently of each other to the left and right driving wheels, one including a planetary gear mechanism that amplifies a torque difference between the two electric motors and transmits torques to left and right wheels has been known. This type of left-right wheel drive device can apply a large torque difference to the left and right wheels while ensuring the differential performance of the left and right wheels at the time of vehicle turning by the action of planetary gear mechanism (for example, refer to Patent Document 1).

PRIOR ART REFERENCE

Patent Document

[Patent Document 1] WO2021/039966

SUMMARY OF INVENTION

Problems to be Solved by Invention

In the left-right wheel drive device disclosed in Patent Document 1, the planetary gear mechanism is relatively large in size and complex in structure, which makes it difficult to arrange oil passages for lubricating bearings arranged in various places. For example, the structure that provides a driven gear, which transmits driving force of the electric motor to the planetary gear mechanism, rotatably about an output shaft interposes a bearing in a narrow range between a fixing member (casing) positioned around the output shaft and the driven gear, so that preferable lubrication performance for the bearing is sometimes not obtained. In addition, a structure that arranges a counter shaft between a motor shaft and an output shaft interposes a bearing in a narrow range between a fixing member (casing) positioned around the motor shaft and the counter shaft, so that preferable lubrication performance for the bearing is sometimes not obtained.

With the foregoing problems in view, one of the objects of the present invention is to provide a left-right wheel drive device capable of enhancing the lubrication performance for bearings with a simple structure. In addition to this object, influences and effects which are derived from each configuration of "Embodiment to carry out the invention" to be described below and which conventional technique does not attain are regarded as other objects of the present disclosure.

Means to Solve Problems of Invention

The left-right wheel drive device disclosed herein can be achieved in the form of the embodiment or application to be disclosed below, and at least partly solves the above problems.

The disclosed left-right wheel drive device accommodates, in a casing, two electric motors that drive a vehicle and a planetary gear mechanism that amplifies a torque difference between the two electric motors and transmits torques to left and right wheels.

The left-right wheel drive device includes: a pair of motor shafts being coaxially arranged, each of the motor shafts being connected to a different motor among the electric motors, and each of the motor shafts comprising a motor gear; a pair of counter shafts being coaxially arranged in parallel with the motor shafts, each of the counter shafts comprising a first counter gear and a second counter gear, the first counter gear meshing with the motor gear, the second counter gear having a diameter smaller than the first counter gear; a pair of output shafts being coaxially arranged in parallel with the counter shafts, arranging the planetary gear mechanism thereon, and each of the output shafts being connected to a different wheel among the left and right wheels; and a pair of driven gears being provided rotatably around the output shafts, meshing one with each of the second counter gears, and transmitting individually a different driving force derived from the electric motors to the planetary gear mechanism.

The left-right wheel drive device further includes: a pair of first tubular surface portions each being formed into a tubular surface shape along an outer circumference of one of the driven gears and serving as a passage that transmits lubricant, which is collected under the output shafts, to a lower side of the counter shafts; a pair of second tubular surface portions each being formed into a tubular surface shape along an outer circumference of one of the first counter gears and collecting lubricant under the counter shafts; a pair of third tubular surface portions each being formed into a tubular surface shape along an outer circumference of one of the first counter gears, each being arranged between a first bearing of the driven gears and the first counter gear, and serving as a passage that transmits lubricant, which is collected by the second tubular surface portions, to an upper side of the output shafts; and a pair of upper surface portions each being formed into a surface shape connected to an upper end of one of the third tubular surface portions, each being arranged over one of the first bearings, and each comprising a first oil hole that supplies lubricant to the first bearing.

Effect of Invention

Including first tubular surface portions, second tubular surface portions, third tubular surface portions, and upper surface portions, the disclosed left-right wheel drive devices can enhance the lubrication performance for bearings with a simple structure.

EMBODIMENT TO CARRY OUR INVENTION

Hereinafter, description will be made in relation to an embodiment applied with the disclosed left-right wheel drive device. The following embodiment is merely exemplary, and there is no intention to eliminate the application of various modifications and techniques not explicitly described in the following embodiment. The configurations of the following embodiment can be variously modified without departing from the scope thereof. Furthermore, the configurations can be selected or omitted according to the requirement or appropriately combined. In the following explanation, a direction in which a vehicle moves forward is referred to as front (vehicle front), the left and right directions are defined on the basis of the front, and the left-right direction of the vehicle is also referred to as a vehicle width direction.

EMBODIMENT(S)

1. Power Transmission Mechanism

Figure 1:
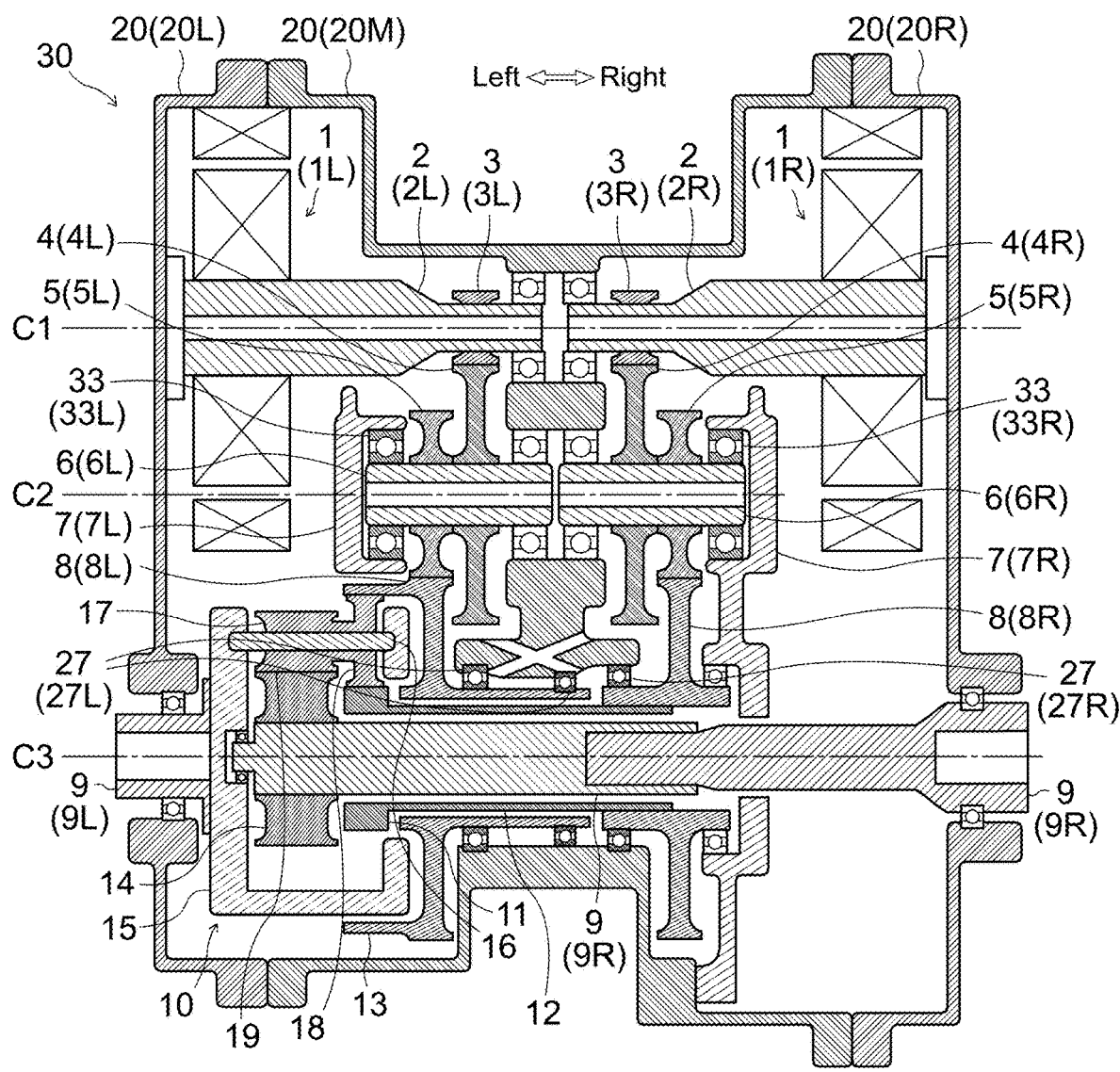
FIG. 1 is a cross-sectional view showing a configuration of a left-right wheel drive device according to an embodiment.
Figure 2:
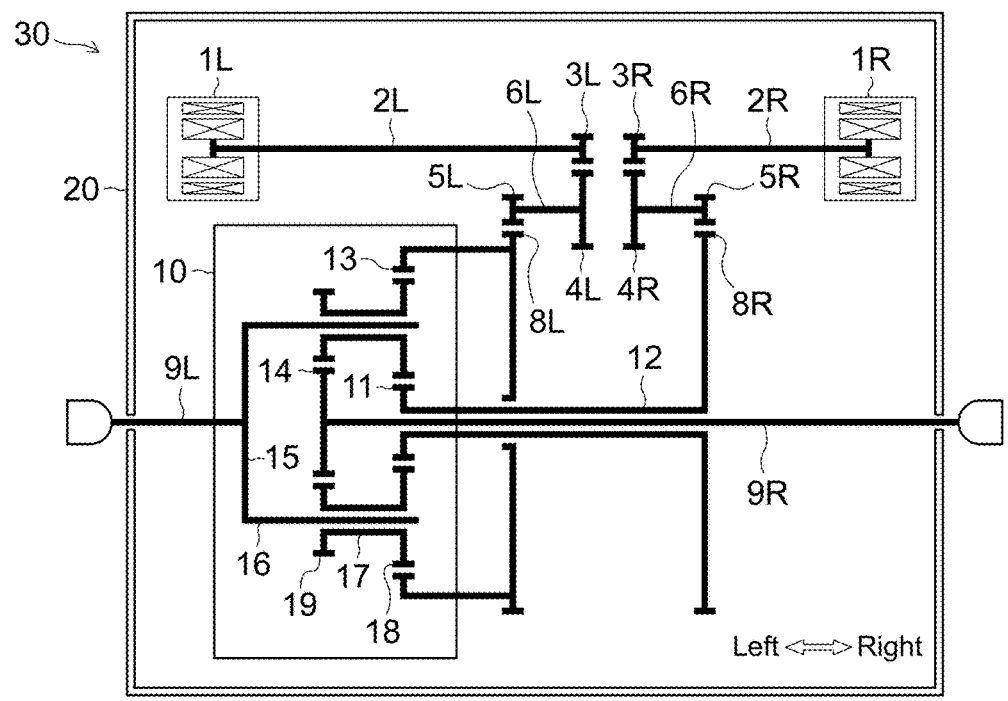
FIG. 2 is a skeleton diagram of the left-right wheel drive device of FIG. 1.

FIG. 1 is a cross-sectional view of a left-right wheel drive device 30 according to an embodiment, and FIG. 2 is a skeleton diagram of the left-right wheel drive device 30. The left-right wheel drive device 30 is a differential device for a vehicle having at least a AYC (active yaw control) function, and is interposed between left and right wheels (driving wheels). The AYC function adjusts the magnitude of the yaw moment by independently controlling the share ratio of the driving force (driving torque) on the left and right wheels, and thereby stabilizes the attitude in the yaw direction of the vehicle. Besides the AYC function, the left-right wheel drive device 30 of this embodiment also has a function for transmitting the driving torque to the left and right wheels to run the vehicle and a function for passively absorbing a difference of the rotational speed between the left and right wheels generated when the vehicle is turning.

As shown in FIGS. 1 and 2, the left-right wheel drive device 30 accommodates, in a casing 20, two electric motors 1 that drive the vehicle and a planetary gear mechanism 10 that amplifies the torque difference of the electric motors 1 and transmits the respective torques to the left and right wheels. In this example, suffix letters R and L which are attached to the numerical signs represent the arrangement positions of the elements related to the signs (i.e., the positions on the right side and the left side of the vehicle). For example, the reference sign 1L represents an electric motor (left motor) located on the left side (Left) and the reference sign 1R represents an electric motor (right motor) located on the right side (Right). The casing 20 is divided into three parts: a left casing 20L, a right casing 20R, and a middle casing 20M. The suffix letter M indicates locating at the middle in the vehicle width direction. In the following explanation, when the arrangement positions of various elements need not be specified, the suffix L, R, M will be omitted appropriately.

The electric motors 1 is an AC (alternate current) motor or a DC (direct current) motor driven by power of a non-illustrated battery. The two electric motors 1 preferably have substantially the same output properties (e.g., maximum output, maximum torque, maximum rotational speed). Each of the two electric motors 1 is provided with a motor shaft 2 having a motor gear 3 (left motor gear 3L or right motor gear 3R). A left motor shaft 2L provided to the left electric motor 1L is arranged coaxially with a right motor shaft 2R provided to the right electric motor 1R. Hereinafter, the rotational centers of the motor shafts 2 are referred to as a first axis C1. Each motor shaft 2 is fixed to a rotor which is inserted inside a stator cylindrically arranged. Here, the two elements of the motor shaft 2 and the motor gear 3 may be integrated.

A pair of counter shafts 6 (left counter shaft 6L, right counter shaft 6R) are provided in the vicinity of the motor shaft 2. The pair of counter shafts 6 are provided parallel to the motor shafts 2 and are coaxially with each other. Hereinafter, the rotational centers of the counter shafts 6 are referred to as a second axis C2. The second axis C2 is arranged in front of the first axis C1 with respect to the vehicle and below the first axis C1, for example. Each counter shaft 6 has a first counter gear 4 (left first counter gear 4L or right first counter gear 4R) and a second counter gear 5 (left second counter gear 5L or right second counter gear 5R). The first counter gear 4 meshes with either motor gear 3. The second counter gear 5 has a diameter smaller than the first counter gear 4. The first counter gear 4 is arranged on the inner side of the second counter gear 5 in the vehicle width direction. The first counter gear 4 is preferably a gear having a diameter larger than the motor gear 3 and functions to reduce the rotational speed of the motor shaft 2 and transmit the reduced rotational speed to the counter shaft 6. All or some of the three elements of the first counter gear 4, the second counter gear 5, and the counter shaft 6 may be integrated.

In regard of the both end portions of each counter shaft 6, the end portion located inner side of the left-right wheel drive device 30 is supported on the middle casing 20M via a bearing, for example. On the other hand, the end portion located outer side the left-right wheel drive device 30 is supported by a supporting member 7 (left supporting member 7L or right supporting member 7R) via a counter bearing 33 (second bearing) which will be described below. The supporting members 7 are plate-shaped members fixed to the middle casing 20M at the outer end portion of respective corresponding counter shafts 6.

A pair of output shafts 9 (left output shaft 9L and right output shaft 9R) are provided in the vicinity of the counter shafts 6. The pair of output shafts 6 are provided parallel to the motor shafts 2 and are coaxially with each other. The pair of output shafts 9 are connected one to each of the left and right wheels. Hereinafter, the rotational centers of the output shafts 9 are referred to as third axis C3. The third axis C3 is arranged in front of the second axis C2 with respect to the vehicle and below the second axis C2, for example. Furthermore, the planetary gear mechanism 10 is arranged on the output shafts 9. In the example shown in FIG. 1, the right output shaft 9R is composed of two shaft-like members, but these may be integrated.

Around the output shafts 9, a pair of driven gears 8 (left driven gear 8L and right driven gear 8R) are provided which transmit individually a different driving force derived from the electric motors 1 to the planetary gear mechanism 10. These driven gears 8 are gears rotatable around the output shafts 9 and are provided so as to mesh with the second counter gears 5. The driven gear 8 is preferably a gear having a diameter larger than the second counter gear 5 and functions to reduce the rotational speed of the counter shaft 6 and transmit the reduced rotational speed to the planetary gear mechanism 10. The driven gear 8 is supported on the middle casing 20M via the driven bearing 27, which will be described below. The right driven gear 8R shown in FIG. 1 is supported not only on the middle casing 20M but also on the right supporting member 7R via a bearing, but the description of the latter support is omitted in the present embodiment.

The planetary gear mechanism 10 is provided with a first sun gear 11, a ring gear 13, a second sun gear 14, a carrier 15, and pinion gears 17. The first sun gear 11 is an external gear driven by one of the driven gears 8, and is arranged coaxially with the output shaft 9, leaving a predetermined gap therebetween. The first sun gear 11 shown in FIGS. 1 and 2 is fixed (e.g., spline-connected) to the right driven gear 8R via a tubular unit 12 and is adapted to rotate integrally with the right driven gear 8R. The tubular unit 12 is a cylindrical member arranged coaxially with the output shafts 9, leaving a predetermined gap therebetween.

The ring gear 13 is an internal gear driven to one of the driven gears 8, and is arranged coaxially with the output shafts 9. The ring gear 13 shown in FIGS. 1 and 2 is integrated with the left driven gear 8L. Between the first sun gear 11 and the ring gear 13, multiple large-diameter tooth units 18 functioning as planetary gears are interposed in a meshed state. The second sun gear 14 is an external gear that outputs driving force to one of the left and right wheels, and is disposed coaxially with the output shafts 9. The second sun gear 14 shown in FIGS. 1 and 2 is connected to the right output shaft 9R.

Multiple small-diameter tooth units 19 are arranged on the outer circumference of the second sun gear 14 in a meshed state. The small-diameter tooth units 19 are integrated with the large-diameter tooth units 18 and are rotatably supported by a pinion shaft 16. The example shown in FIG. 1 illustrates the pinion gear 17 including the large-diameter tooth units 18 and the small-diameter tooth units 19, and the pinion shaft 16 loosely inserted into the rotational center of the pinion gear 17. The both ends of the pinion shaft 16 are fixed to the carrier 15 arranged coaxially with the output shafts 9. The carrier 15 shown in FIGS. 1 and 2 is connected to the left output shaft 9L. The three types of elements of the pinion shaft 16, the large-diameter tooth units 18, and the small-diameter tooth units 19 may be integrated, or part of these elements may be integrally formed, and the large-diameter tooth units 18 and the small-diameter tooth units 19 may be separately formed.

2. Lubrication Structure

A. Lubrication of Driven Bearing

Figure 3:
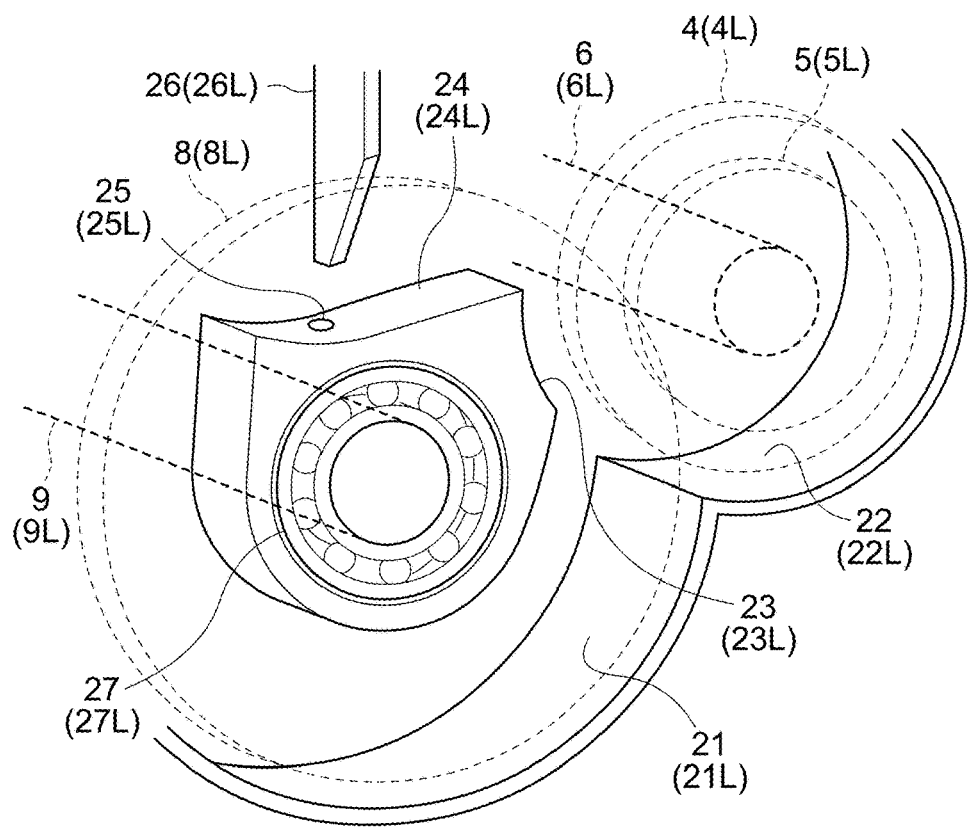
FIG. 3 is an isometric view of a main part (around a driven gear) of the left-right wheel drive device of FIG. 1.
Figure 4:
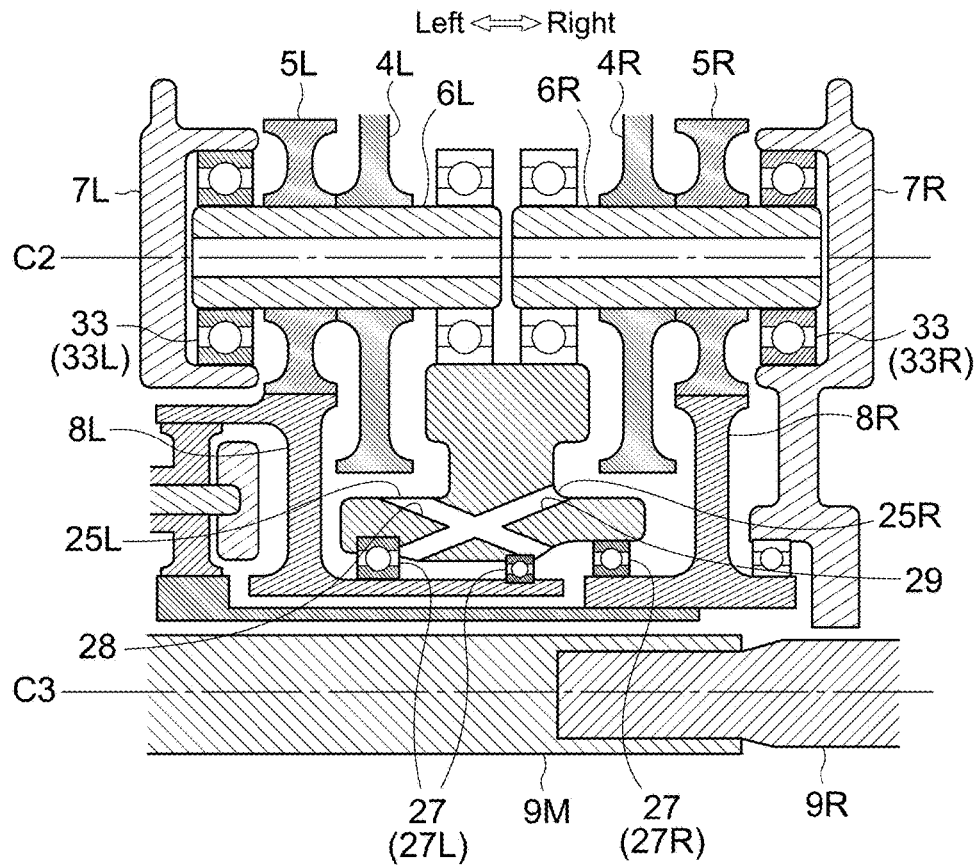
FIG. 4 is an enlarged cross-sectional view of the main part (around the driven gear) of the left-right wheel drive device of FIG. 1.

FIG. 3 is an isometric diagram showing a peripheral structure of a meshing point between the second counter gear 5 (left second counter gear 5L) and the driven gear 8 (left driven gear 8L), and FIG. 4 is a cross-sectional view showing enlargement of the peripheral structure thereof. Around the driven gear 8, a first tubular surface portion 21 is provided which is formed in an inward tubular surface shape along the outer circumference of the tooth surface of the driven gear 8. The first tubular surface portion 21 is, for example, formed to have a size that covers the lower half of the tooth surface of the driven gear 8. The first tubular surface portion 21 of the present embodiment serves as a passage that transmits lubricant collected under the output shafts 9 to the lower side of the counter shafts 6. FIG. 3 illustrates the left first tubular surface portion 21L formed into a tubular shape along the outer circumference of the tooth surface of the left driven gear 8L, but a similar right first tubular surface portion 21R is provided along the outer circumference of the tooth surface of the right driven gear 8R.

As shown in FIG. 3, a second tubular surface portion 22 formed in an inward tubular surface shape along the outer circumference of the tooth surface of the first counter gear 4 is provided around the first counter gear 4 and the second counter gear 5. The second tubular surface portion 22 is, for example, formed to have a size that covers the lower halves of the first counter gear 4 and the second counter gear 5. The second tubular surface portion 22 of the present embodiment serves as a pool that temporarily stores lubricant at a position below the counter shafts 6 and above the first tubular surface portion 21. The first tubular surface portion 21 and the second tubular surface portion 22 form a continuous curved surface. FIG. 3 illustrates the left second tubular surface portion 22L formed in a tubular surface shape along the outer circumference of the tooth surface of the left first counter gear 4L, but a similar right second tubular surface portion 22R is formed along the outer circumference of the tooth surface of the right first counter gear 4R.

The driven gear 8 is supported on the middle casing 20M via at least one driven bearing 27 (first bearing). In the example shown in FIGS. 1 and 4, the left driven gear 8L is supported by two left driven bearings 27L, and the right driven gear 8R is supported by one right driven bearing 27R. The position of each driven bearing 27 is set inside from the driven gear 8 that the driven bearing 27 supports in the left-right wheel drive device 30. The phrase "inside from the driven gear 8" used herein means the direction in which first counter gear 4 is present on the basis of the second counter gear 5 meshing with the driven gear 8. In the example shown in FIG. 3, the driven bearings 27 are arranged along the depth direction from the upper left side of the driven gear 8 in the drawing.

As shown in FIG. 3, a third tubular surface portion 23 formed in an inward tubular surface shape along the outer circumference of the tooth surface of the first counter gear 4 is provided between the driven bearing 27 and the first counter gear 4. The radius of curvature of the third tubular surface portion 23 may be the same as or different from the radius of curvature of the second tubular surface portion 22. Third tubular surface portion 23 may be formed discontinuously from or be formed to have a continuous curved surface to the second tubular surface portion 22. The third tubular surface portion 23 of the present embodiment serves as a passage that transmits lubricant collecting in the second tubular surface portion 22 to the upper side of the output shafts 9. FIG. 3 illustrates the left third tubular surface portion 23L formed in a tubular surface shape along the outer circumference of the tooth surface of the left first counter gear 4L, but a similar right third tubular surface portion 23R is formed along the outer circumference of the tooth surface of the right first counter gear 4R.

At the portion over the driven bearing 27, an upper surface portion 24 is formed in a surface shape (a flat surface shape or curved surface shape) connected to an upper end of the third tubular surface portion 23 is provided. The upper surface portion 24 is provided with a first oil hole 25 to supply lubricant to the driven bearing 27. The upper surface portion 24 of the present embodiment is formed so as to have a downward slope from the upper end of the third tubular surface portion 23 toward the first oil hole 25. With this structure, the lubricant transferred onto the upper surface portion 24 is introduced into the driven bearing 27 through the first oil hole 25. FIG. 3 illustrates the left upper surface portion 24L and the left first oil hole 25L formed over the left driven bearing 27L, but a similar right upper surface portion 24R and right first oil hole 25R are also provided over the right driven bearing 27R. The first oil hole 25 is preferably arranged at the lowest position of the upper surface portion 24.

As shown in FIG. 4, a first oil passage 28 is connected to the left first oil hole 25L, and a second oil passage 29 is connected to the right first oil hole 25R. The first oil passage 28 and second oil passage 29 of the present embodiment are formed in substantially linear shapes and are formed in shapes intersecting with each other in the middle. Furthermore, the downward slopes of the first oil passage 28 and the second oil passage 29 are set in accordance with the arrangement of the driven bearings 27. By intersecting the first oil passage 28 with the second oil passage 29, even if the amount of lubricant flowing from the left first oil hole 25L and that from the right first oil hole 25R become unbalanced, the lubricant supplied to the right driven bearing 27R and that to the left driven bearing 27L can be well balanced.

As shown in FIG. 3, above the first oil hole 25, a first plate member 26 is provided for recollecting lubricant scattering above the upper surface portion 24 and the driven gear 8 and dropping the recollected lubricant in the vicinity of the first oil hole 25. The first plate member 26 is a member formed in a planar shape (a flat or curved plate surface shape) and is arranged substantially perpendicular to a rotating surface of the driven gear 8. The lower end portion of the first plate member 26 may be formed in a shape pointed downward to easily collect, at one point, lubricant adhering the plate surface. FIG. 3 illustrates the left first plate member 26L arranged above the left first oil hole 25L, but a similar right first plate member 26R is also provided above the right first oil hole 25R.

B. Lubrication of Counter Bearing

Figure 5A:
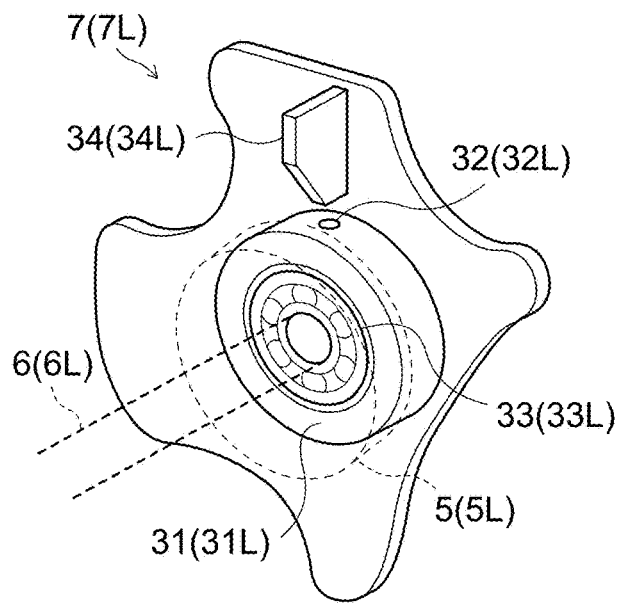
FIGS. 5A and 5B are isometric views of a main part (around a supporting member) of the left-right wheel drive device of FIG. 1.
Figure 5B:
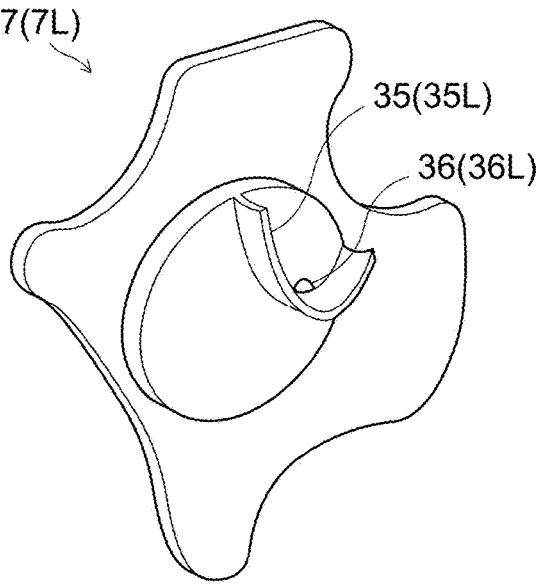

FIG. 5A is an isometric view showing the inner surface side of the supporting member 7 (the surface facing the inside of the left-right wheel drive device 30), and FIG. 5B is an isometric view showing the outer surface side (the surface facing the outside of left-right wheel drive device 30), which is the backside of the inner surface. As shown in FIG. 5A, a boss portion 31 and a second plate member 34 are provided on the inner surface side of the supporting member 7. The boss portion 31 is a portion inside of which a counter bearing 33 (second bearing) is supported, and protrudes into a cylindrical shape. In the example shown in FIG. 4, the right counter shaft 6R is supported in the right supporting member 7R by the right counter bearing 33R, and the left counter shaft 6L is supported in the left supporting member 7L by the left counter bearing 33L. On the upper surface of the boss portion 31, a second oil hole 32 for supplying lubricant to the counter bearing 33 is provided. With this structure, the lubricant adhering to the upper surface of the boss portion 31 is introduced into the counter bearing 33 through the second oil hole 32.

Above the second oil hole 32, a second plate member 34 is provided for recollecting lubricant scattering above the boss portion 31 and a second counter gear 5 and dropping the recollected lubricant in the vicinity of the second oil hole 32. The second plate member 34 is a member formed in a planar shape (a flat or curved plate shape) and is arranged substantially perpendicularly to a rotating surface of the second counter gear 5. The lower end portion of the second plate member 34 may be formed in a shape pointed downward to easily collect lubricant adhering the plate surface at one point. FIG. 5A illustrates the left boss portion 31L, the left second oil hole 32L, the left second plate member 34L of the left supporting member 7L, but a right boss portion 31R, a right second oil hole 32R, a right second plate member 34R similar to the above elements are also provided on the right supporting member 7R.

As shown in FIG. 5B, a recollect wall portion 35 is provided on the outer surface side of the supporting member 7 for capturing lubricant scattering from the motor shaft 2 and the electric motor 1 adjacent to the counter shaft 6 and supplying the captured lubricant to the counter bearing 33. The recollect wall portion 35 is a portion protruding from the supporting member 7 toward an opposite direction to the boss portion 31, and is formed into a container shape which can recollect lubricant scattering from the surface of motor shaft 2. In this example, when supporting member 7 is viewed from the outside of the left-right wheel drive device 30 along the second axis C2, the motor shaft 2 is located on the rear side and the upper side of the counter shaft 6 on the basis of the vehicle. To deal with this arrangement, the side-view shape of the recollect wall portion 35 is a bowl shape (a shape protruding downward like a bowl) that is expanded toward the rear side and the upper side of the vehicle (the upper right side in FIG. 5B).

Inside the recollect wall portion 35, a third oil hole 36 for supplying lubricant to the counter-bearing 33 is provided. The third oil hole 36 is preferably arranged at the lowest position of the inside of the recollect wall portion 35. With this structure, the lubricant recollected inside the recollect wall portion 35 is introduced into the counter bearing 33 through the third oil hole 36. FIG. 5B illustrates a left recollect wall portion 35L and a left third oil hole 36L formed in the left supporting member 7L, but the right supporting member 7R is also provided with a similar right recollect wall portion 35R and a similar right third oil hole 36R.

3. Action and Effect (1) The above-described left-right wheel drive device 30 includes the pair of motor shafts 2, the pair of counter shafts 6, the pair of output shafts 9, and the pair of driven gears 8. The motor shafts 2 are provided one to each of the two electric motors 1, are arranged coaxially with each other, and each have the motor gear 3. The counter shafts 6 are arranged in parallel with the motor shafts 2, are arranged in pair coaxially with each other, and each have the first counter gear 4 that meshes with the motor gear 3 and the second counter gear 5 that is smaller in diameter than the first counter gear 4. The output shafts 9 are arranged in parallel with the counter shafts 6, are arranged in pair coaxially with each other, arrange the planetary gear mechanism 10 thereon, and are connected one to each of the left and right wheels. The driven gears 8 are provided rotatably about output shafts 9, mesh one with each of the pair of second counter gears 5, and transmit independent of each other driving forces of the two electric motors 1 to the planetary gear mechanism 10.

The above left-right wheel drive device 30 further includes the pair of first tubular surface portions 21, the pair of second tubular surface portions 22, the pair of third tubular surface portions 23, and the pair of upper surface portions 24. The first tubular surface portions 21 are each formed into a tubular surface shape along the outer circumference of one of the pair of driven gears 8 and serve as passages that transmit, to the lower side of the pair of counter shafts 6, lubricant collected under the pair of output shafts 6. The second tubular surface portions 22 are each formed into a tubular surface shape along the outer circumference of one of the pair of first counter gears 4 and collect lubricant under the pair of counter shafts 6. The third tubular surface portions 23 are each formed into a tubular surface shape along the outer circumference of one of the pair of driven gears 8, are each arranged between a first bearing of one of the pair of driven gears 8 and the first counter gear 4, and each serve as a passage that transmits, to an upper side of the pair of output shafts, lubricant collecting at one of the pair of second tubular surface portion 22. The upper surface portions 24 are each formed into a face connected to an upper end of one of the third tubular surface portion 23, each arranged over one of the driven bearings 27, and each include the first oil hole 25 that supplies lubricant to one of the driven bearings 27.

While the driven gears 8 shown in FIG. 3 are rotating counterclockwise in the drawing, the first counter gears 4 and the second counter gears 5 rotate clockwise in the drawing. A part of the lubricant collecting under the output shafts 9 is scraped up by the driven gears 8, is scattered upward, and is transferred to the upper surface portions 24. In addition, a part of the lubricant adheres to the second counter gears 5 from the driven gears 8, is scattered upward by the rotation of the second counter gear 5, and is transferred to the upper surface portion 24. Further, a part of the lubricant scraped up by the driven gears 8 flows through the surfaces of the first tubular surface portions 21 and is transferred to the second tubular surface portions 22, then is scraped up by the first counter gears 4 and flows through the surfaces of the third tubular surface portions 23 and is transferred to the upper surface portions 24. As described above, in lubrication of the driven bearings 27 of the driven gears 8, by setting multiple transferring paths of the lubricant by using both the first counter gears 4 and the second counter gears 5, the lubricant can stably flow into the first oil holes 25 of the upper surface portions 24, so that the lubrication performance can be enhanced.

(2) In the above left-right wheel drive device 30, as shown in FIG. 4, the first oil passage 28 connected to the left first oil hole 25L and the second oil passage 29 connected to the right first oil hole 25R are formed so as to intersect with each other. The first oil passage 28 extends from the left first oil hole 25L toward the right driven bearing 27R, and the second oil passage 29 extends from the right first oil hole 25R toward the left driven bearing 27L. If the first oil passage 28 and the second oil passage 29 do not intersect, the first oil passage 28 and the second oil passage 29 serve as passages that lubricate the right-driven bearing 27R and the left-driven bearing 27L, respectively. Thus, for example, if the amount of lubricant flowing in from the first oil passage 28 and that from the second oil passage 29 becomes unbalanced due to the incline of the left-right wheel drive device 30 (inclination of the vehicle body in the rolling direction), the amount of lubricant supplied to either the right-driven bearing 27R or the left-driven bearing 27L may become insufficient. In contrast, since the first oil passage 28 intersects with the second oil passage 29 in the present embodiment, the lubricant flowing into each of first oil passage 28 and the second oil passage 29 is distributed to both the right-driven bearing 27R and the left-driven bearing 27L. Consequently, the supply balance of the lubricant can be stabilized, so that the lubrication performance for the driven bearings 27 can be enhanced.

(3) As shown in FIG. 3, the left-right wheel drive device 30 is provided with a planar first plate member 26 disposed above the first oil hole 25 in a direction substantially perpendicular to the rotating surface of the driven gear 8. With this configuration, the lubricant scattering above the output shafts 9 can be recollected by causing the lubricant to adhere to the first plate member 26 and dropped near the first oil hole 25. Therefore, the lubrication performance for the driven bearings 27 can be improved.

(4) In the left-right wheel drive device 30 described above, the counter shafts 6 are supported by the pair of supporting members 7 fixed to the casing 20. As illustrated in FIGS. 5A and 5B, each supporting member 7 is provided with the boss portion 31 and the recollect wall portion 35. The boss portion 31 protrudes into a cylindrical shape in which the counter bearing 33 is supported and has the second oil hole 32 for supplying lubricant to the counter bearing 33. The recollect wall portion 35 protrudes toward an opposite direction to the boss portion 31, is formed into a container shape which can recollect lubricant scattering from the surface of motor shaft 2, and further has a third oil hole 36 for supplying lubricant oil to the counter bearing 33. As described above, in lubrication of the counter bearing 33, setting multiple transferring paths of the lubricant makes it possible to stably supply the lubricant to the counter bearing 33, so that the lubrication performance for the counter bearing 33 can be enhanced. In addition, it is possible to efficiently lubricate the counter bearing 33 by effectively utilizing abundant lubricant scattering from the motor shafts 2 and the rotors of the electric motors 1.

(5) As shown in FIG. 5A, the left-right wheel drive device 30 is provided with a second plate member 34 disposed above the second oil hole 32 substantially perpendicularly to the rotating surface of the second counter gear 5. With this configuration, the lubricant scattering above the counter shaft 6 can be recollected by causing the lubricant to adhere to the second plate member 34 and dropped near the vicinity of the second oil hole 32. Accordingly, the lubrication performance for the counter bearing 33 can be enhanced.

4. Miscellaneous

The above embodiment illustrates a left-right wheel drive device 30 in which the first axis C1 is arranged on the rear side and the upper side of the second axis C2 with respect to the vehicle and the second axis C2 is arranged on the rear side and the upper side of the third axis C3 with respect to the vehicle. However, the specific internal structure of the left-right wheel drive device 30 is not limited to such a structure. Focusing on the lubrication structure, it is sufficient that the left-right wheel drive device 30 includes at least a pair of motor shafts 2, a pair of counter shafts 6, a pair of output shafts 9, and a pair of driven gears 8, and further includes a pair of first tubular surface portions 21, a pair of second tubular surface portions 22, a pair of third tubular surface portions 23, and a pair of upper surface portions 24. The above configuration brings the same effects as those of the above-described embodiment.

DESCRIPTION OF REFERENCE SIGN

1: electric motor
2: motor shaft
3: motor gear
4: first counter gear
5: second counter gear
6: counter shaft
7: supporting member
8: driven gear
9: output shaft
10: planetary gear mechanism
11: first sun gear
12: tubular unit 13: ring gear
14: second sun gear
15: carrier
16: pinion shaft
17: pinion gear
18: large-diameter tooth unit
19: small-diameter tooth unit
20: casing
21: first tubular surface portion
22: second tubular surface portion
23: third tubular surface portion
24: upper surface portion
25: first oil hole
26: first plate member
27: driven bearing (first bearing)
28: first oil passage
29: second oil passage
30: left-right wheel drive device
31: boss portion
32: second oil hole
33: counter bearing (second bearing)
34: second plate member
35: recollect wall portion
36: third oil hole
C1: first axis
C2: second axis
C3: third axis

The invention claimed is:

1. A left-right wheel drive device that accommodates, in a casing, two electric motors that drive a vehicle and a planetary gear mechanism that amplifies a torque difference between the two electric motors and transmits torques to left and right wheels, the left-right wheel drive device comprising:
   a pair of motor shafts being coaxially arranged, each of the motor shafts being connected to a different motor among the electric motors, and each of the motor shafts comprising a motor gear;
   a pair of counter shafts being coaxially arranged in parallel with the motor shafts, each of the counter shafts comprising a first counter gear and a second counter gear, the first counter gear meshing with the motor gear, the second counter gear having a diameter smaller than the first counter gear;
   a pair of output shafts being coaxially arranged in parallel with the counter shafts, arranging the planetary gear mechanism thereon, and each of the output shafts being connected to a different wheel among the left and right wheels;
   a pair of driven gears being provided rotatably around the output shafts, meshing one with each of the second counter gears, and transmitting individually a different driving force derived from the electric motors to the planetary gear mechanism; a pair of first tubular surface portions each being formed into a tubular surface shape along an outer circumference of one of the driven gears and serving as a passage that transmits lubricant, which is collected under the output shafts, to a lower side of the counter shafts;
   a pair of second tubular surface portions each being formed into a tubular surface shape along an outer circumference of one of the first counter gears and collecting lubricant under the counter shafts;
   a pair of third tubular surface portions each being formed into a tubular surface shape along an outer circumference of one of the first counter gears, each being arranged between a first bearing of the driven gears and the first counter gear, and serving as a passage that transmits lubricant, which is collected by the second tubular surface portions, to an upper side of the output shafts; and
   a pair of upper surface portions each being formed into a surface shape connected to an upper end of one of the third tubular surface portions, each being arranged over one of the first bearings, and each comprising a first oil hole that supplies lubricant to the first bearing.

2. The left-right wheel drive device according to claim 1, further comprising:
   a first oil passage being connected to a first one of the first oil holes and supplies lubricant to a first one of the first bearings; and
   a second oil passage having a shape intersecting with the first oil passage, being connected to a second one of the first oil holes and supplies lubricant to a second one of the first bearings.

3. The left-right wheel drive device according to claim 1, further comprising
   a first plate member being arranged substantially perpendicularly to a rotating surface of each of the driven gears and being arranged above each of the first oil holes.

4. The left-right wheel drive device according to claim 1, further comprising
   a pair of supporting members each being fixed to the casing at an end of one of the pair of the counter shafts and supporting the counter shaft via a second bearing, wherein
   each of the supporting members comprises
      a boss portion protruding into a cylindrical shape that fixes the second bearing therein and comprising a second oil hole that provides lubricant to the second bearing;
      a recollecting wall protruding toward an opposite direction to the boss portion, being formed into a container shape capable of recollecting lubricant scattering from a surface of the pair of motor shafts and having a third oil hole that supplies lubricant to the second bearing.

5. The left-right wheel drive device according to claim 4, further comprising
   a second plate member being arranged substantially perpendicularly to a rotating surface of each of the second counter gears and being arranged above each of the second oil hole.

* * * * *